| (12) United States Patent<br>Hendrix et al. | (10) Patent No.: US 12,044,895 B2<br>(45) Date of Patent: Jul. 23, 2024 |
|---|---|

(54) FIBER DISTRIBUTION MODULE

(71) Applicant: viaPhoton, Inc., Aurora, IL (US)

(72) Inventors: Walter Mark Hendrix, Richardson, TX (US); Elizabeth Grace Dabdoub, Bartlett, IL (US); Eric Russell Klootwyk, Oak Lawn, IL (US); Keith Samuel Maranto, Frankfort, IL (US)

(73) Assignee: viaPhoton, Inc., Aurora, IL (US)

( * ) Notice: Subject to any disclaimer, the term of this patent is extended or adjusted under 35 U.S.C. 154(b) by 284 days.

(21) Appl. No.: 17/555,008

(22) Filed: Dec. 17, 2021

(65) Prior Publication Data

US 2022/0196951 A1     Jun. 23, 2022

Related U.S. Application Data

(60) Provisional application No. 63/251,390, filed on Oct. 1, 2021, provisional application No. 63/127,379, filed on Dec. 18, 2020.

(51) Int. Cl.
*G02B 6/00* (2006.01)
*G02B 6/38* (2006.01)
*G02B 6/44* (2006.01)

(52) U.S. Cl.
CPC ......... *G02B 6/4446* (2013.01); *G02B 6/3897* (2013.01)

(58) Field of Classification Search
CPC ....... G02B 6/4446; G02B 6/3897; G02B 6/00
See application file for complete search history.

(56) References Cited

U.S. PATENT DOCUMENTS

| 7,653,282 | B2 | 1/2010 | Blackwell, Jr. et al. | |
|---|---|---|---|---|
| 9,448,365 | B2 * | 9/2016 | Fletcher | G02B 6/3879 |
| 9,575,277 | B2 † | 2/2017 | Bakatsias | |
| 9,618,720 | B2 * | 4/2017 | Sayres | G02B 6/46 |
| 11,609,401 | B2 * | 3/2023 | de León | G02B 6/255 |
| 2013/0294735 | A1 * | 11/2013 | Burris | G02B 6/4416 |
| | | | | 385/101 |
| 2018/0090895 | A1 * | 3/2018 | Wang | H01R 25/003 |

FOREIGN PATENT DOCUMENTS

EP          3798706 A1 †    3/2021

* cited by examiner
† cited by third party

*Primary Examiner* — Jennifer Doan
(74) *Attorney, Agent, or Firm* — Ferguson Braswell Fraser Kubasta PC

(57) ABSTRACT

An apparatus implements a cable distribution module. The apparatus includes a trunk cable with inner cables and includes breakout cables that correspond to the inner cables. The apparatus further includes a transition breakout between the trunk cable and the breakout cables and includes an outdoor rated path that includes the trunk cable, the transition breakout, and the one or more breakout cables. The apparatus further includes connectors to which the breakout cables are connected and an unsealed module supporting the one or more connectors.

20 Claims, 13 Drawing Sheets

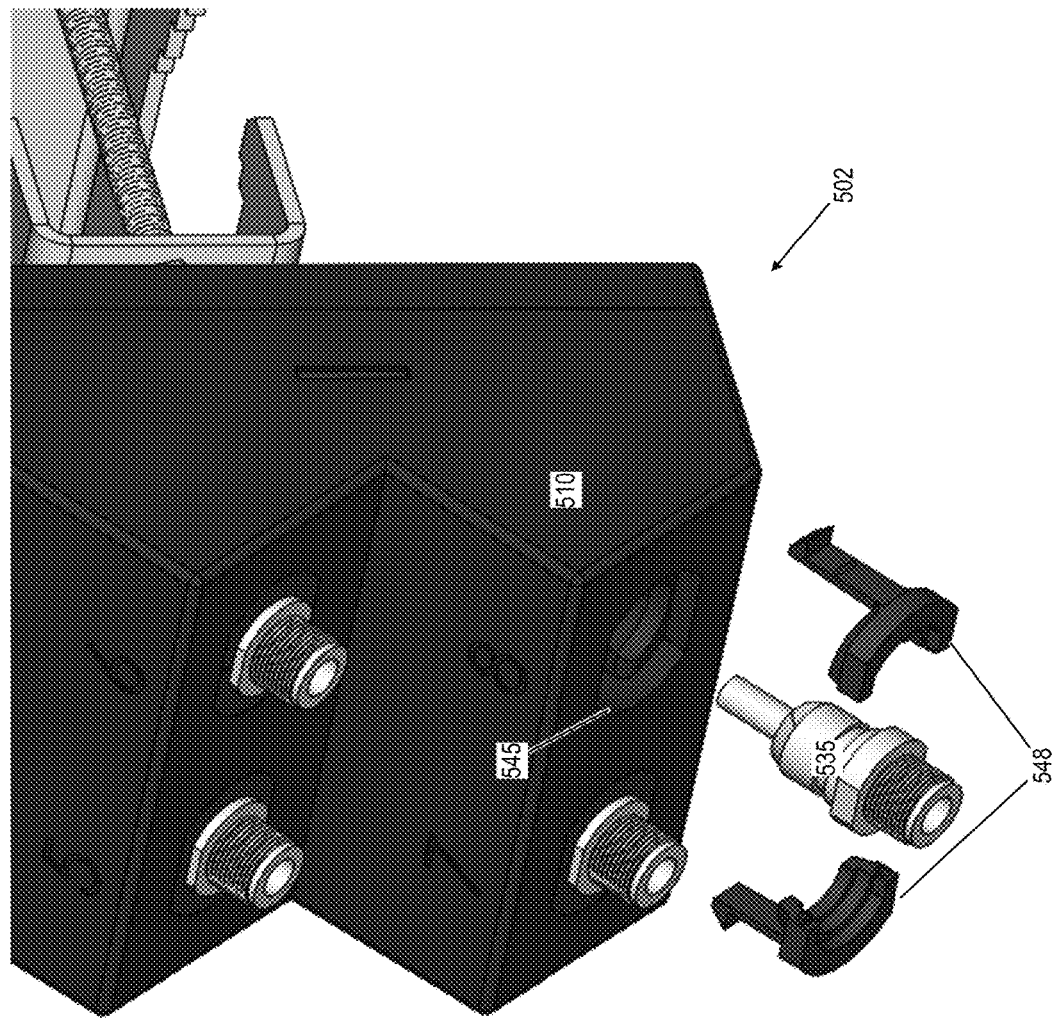

FIBER DISTRIBUTION MODULE

CROSS-REFERENCE TO RELATED APPLICATIONS

This application claims the benefit of U.S. Provisional Application 63/251,390, filed Oct. 1, 2021, and U.S. Provisional Application 63/127,379, filed Dec. 18, 2020. Each of the applications identified above are incorporated by reference herein.

BACKGROUND

Trunk cables are used transmit power and data with optical and electrical signals. Trunk cables contain inner cables that are broken out from the trunk cable to connect the inner cables (also referred to as breakout cables) to power and data communications equipment. A challenge is to break out the inner cables from the trunk cable and protect the inner cables from outdoor environments.

SUMMARY

In general, in one or more aspects, the disclosure relates to an apparatus that implements a cable distribution module. The apparatus includes a trunk cable with inner cables and includes breakout cables that correspond to the inner cables. The apparatus further includes a transition breakout between the trunk cable and the breakout cables and includes an outdoor rated path that includes the trunk cable, the transition breakout, and the one or more breakout cables. The apparatus further includes connectors to which the one or more breakout cables are connected and an unsealed module supporting the one or more connectors.

In general, in one or more aspects, the disclosure relates to a method that includes. providing a trunk cable with one or more inner cables and providing one or more breakout cables corresponding to the one or more inner cables. The method further includes installing a transition breakout between the trunk cable and the one or more breakout cables and includes forming an outdoor rated path that includes the trunk cable, the transition breakout, and the one or more breakout cables. The method further includes providing one or more connectors to which the one or more breakout cables are connected and includes supporting the one or more connectors with an unsealed module.

In general, in one or more aspects, the disclosure relates to an apparatus that includes a transition breakout with a trunk end and a breakout end. The apparatus further includes a trunk end cap that receives a trunk cable and is affixed to the trunk end and includes a breakout endcap that receives one or more breakout cables and is affixed to the breakout end. The apparatus further includes a covering surrounding the transition breakout, a portion of the trunk cable, and a portion of the one or more breakout cables to form an outdoor rated path through the transition breakout.

Other aspects of the invention will be apparent from the following description and the appended claims.

BRIEF DESCRIPTION OF DRAWINGS

FIG. 3A, FIG. 3B, FIG. 4A, FIG. 4B, FIG. 5A, FIG. 5B, FIG. 5C, FIG. 5D, FIG. 5E, FIG. 5F, FIG. 5G, FIG. 6, FIG. 7, FIG. 8, FIG. 9, and FIG. 10 show examples in accordance with disclosed embodiments.

DETAILED DESCRIPTION

Figure 1:
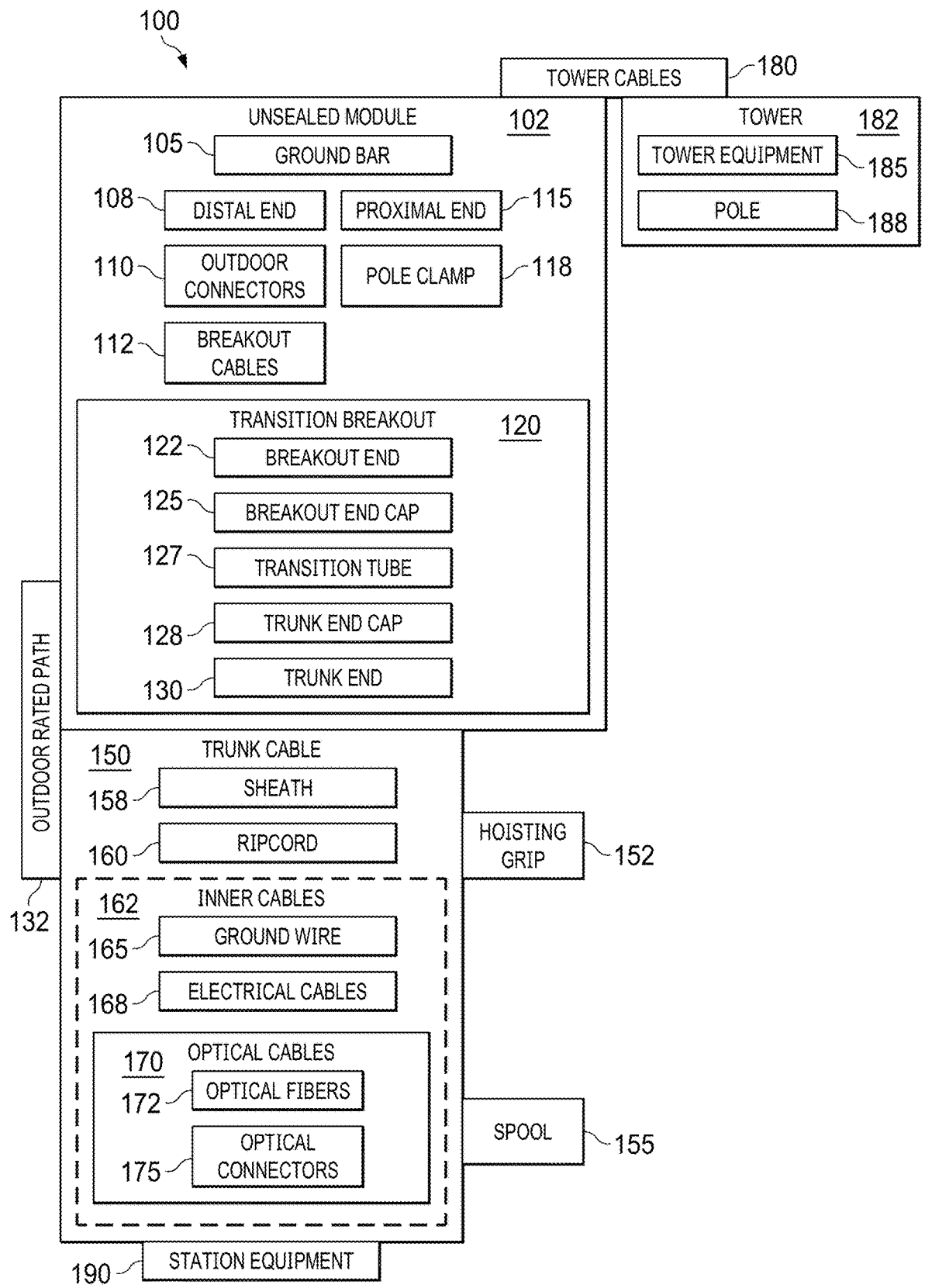
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure provide a fiber distribution module that breaks out and protects the inner cables from outdoor environments. The fiber distribution module is unsealed to reduced complexity. The trunk cable, the breakout cables, and the transition breakout between the trunk cables and the breakout cables are individually sealed to protect the cables from outdoor environments. The unsealed module has a modular design that discloses connectors for cables that run from the unsealed module to the communications equipment on a tower.

FIG. 1 shows diagrams of systems that are in accordance with the disclosure. Embodiments of FIG. 1 may be combined and may include or be included within the features and embodiments described in the other figures of the application. The features and elements of FIG. 1 are, individually and as a combination, improvements to cable distribution technology and systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the system (100) is a data communication system. The system (100) includes the tower (182) and the station equipment (190) that are connected by the trunk cable (150) and the unsealed module (102).

The unsealed module (102) encloses the breakout cables (112) and supports the outdoor connectors (110) to which the breakout cables (112) are connected. The unsealed module (102) is not sealed against the environment to reduce complexity of the unsealed module (102), which may expose the elements within the unsealed module (102) (e.g., the breakout cables (112)) to factors of an outdoor environment including dirt, water, temperature extremes, etc. The unsealed module (102) may be made from rigid plastic to support the elements within the unsealed module (102). The unsealed module (102) includes the ground bar (105), the outdoor connectors (110), the pole clamp (118), the breakout cables (112), and the transition breakout (120).

The ground bar (105) is an electrical ground for the components of the system (100). For example, the tower equipment (185) may include multiple components with separate ground wires that are connected to the ground bar (105). In one embodiment, the ground bar (105) includes multiple screw terminals in which a ground wires are held to the ground bar (105) with tightened screws.

The outdoor connectors (110) provide connection points for the tower cables (180), which connect to the tower equipment (185). The outdoor connectors (110) may include a number of electrical connectors, optical connectors, hybrid connectors, etc. The hybrid connectors may include connections for optical connectors and for electrical connectors.

In one embodiment, the outdoor connectors (110) may be angled. For example, the outdoor connectors (110) may be angled with respect to the pole (188) by about 45 degrees downward (away from the sky) after the unsealed module (102) is installed to the pole (188) of the tower (182).

The pole clamp (118) attaches the unsealed module (102) to the tower (182). The pole clamp (118) fastens to the pole (188) of the tower (182). In one embodiment, the pole clamp (118) is attached to the proximal end (115) of the unsealed module (102).

The breakout cables (112) are an extension of the inner cables (162) from the trunk cable (150). The breakout cables (112) extend from the transition breakout (120) to the outdoor connectors (110). The breakout cables (112) are individually sealed against environmental conditions. The breakout cables (112) may include an additional sheath to cover and protect individual ones of the breakout cables (112). The additional sheath protects the cables (power conductors, optical fibers, electrical wires, etc.) within the breakout cables (112) as the breakout cables extend between the breakout end (122) of the transition breakout (120) to the outdoor connectors (110).

The transition breakout (120) breaks out the inner cables (162) from the trunk cable (150) to the breakout cables (112). The transition breakout (120) includes the breakout end (122), the breakout end cap (125), the transition tube (127), the trunk end cap (128), and the trunk end (130).

The breakout end (122) of the transition breakout (120) receives the breakout end cap (125). The breakout cables (112) extend out from the breakout end (122) into the unsealed module (102).

The breakout end cap (125) receives the breakout cables (112). The breakout end cap (125) may be made of a rigid plastic and includes holes for each of the breakout cables (112). The breakout end cap (125) is attached to the breakout end (122) of the transition breakout (120).

The transition tube (127) is a tube to which the breakout end cap (125) and the trunk end cap (128) are fastened. The transition tube (127) is the portion of the transition breakout (120) where the inner cables (162) (from the trunk cable (150)) are connected to the breakout cables (112). In one embodiment, one or more of the inner cables (162) may be individually spliced to one or more of the breakout cables (112).

The trunk end cap (128) receives the trunk cable (150). The trunk end cap (128) may be made of a rigid plastic and includes a hole for the trunk cable (150). In one embodiment, the trunk end cap (128) may include multiple holes for multiple trunk cables that are spliced through to the breakout cables (112). The trunk end cap (128) is attached to the trunk end (130) of the transition breakout (120).

The trunk end (130) of the transition breakout (120) receives the trunk end cap (128). The trunk cable (150) extends out from the trunk end (130).

In one embodiment, the unsealed module (102) includes the distal end (108) and the proximal end (115). The distal end (108) may form a cover of the unsealed module (102) to which the outdoor connectors (110) are attached. The cover provides sufficient room for the optical fibers of the inner cables (162) to reach the outdoor connectors (110) and maintain the bend radii of the optical fibers. The proximal end (115) may form a base of the unsealed module (102) to which the pole clamp (118) is attached.

The outdoor rated path (132) is the path formed by the trunk cable (150), the transition breakout (120), and the breakout cables (112). In one embodiment, the individual wires and fibers that carry optical and electrical signals through the trunk cable (150), the transition breakout (120), and the breakout cables (112) are not individually rated for use outdoors. The individual wires and fibers may be susceptible to damage from environmental factors including temperature extremes, water, etc. Securing the individual wires and fibers within the trunk cable (150), the transition breakout (120), and the breakout cables (112) protects the individual wires and fibers and the power and data signals from environmental factors.

The trunk cable (150) connects between the unsealed module and the station equipment (190) to provide power and data signals to the tower equipment (185). The trunk cable (150) includes the sheath (158), the ripcord (160) the inner cables (162), the hoisting grip (152), and the spool (155).

The sheath (158) is an outer covering of the trunk cable (150). The sheath (158) protects the inner cables (162) from environmental factors. In one embodiment, the sheath is made from waterproof airtight plastic and prevents water, dirt, and air from reaching the inner cables (162).

The ripcord (160) is an industrial yarn located longitudinally just under the sheath (158). The ripcord (160), when pulled, cuts back the sheath (158) to expose the inner cables (162) without cutting the inner cables (162).

The inner cables (162) are the set of cables that carry power and communication signals along the trunk cable (150). The inner cables (162) may not be individually protected against environmental conditions and be susceptible to damage when exposed to an outdoor environment, e.g., outside of the trunk cable (150). The inner cables (162) include the ground wire (165), the electrical cables (168), and the optical cables (170).

The ground wire (165) is an electrical wire that is connected to ground when the trunk cable (150) is installed. The ground wire (165) prevents excess charge from building up inside the trunk cable (150).

The electrical cables (168) are a set of one or more cables in the trunk cable (150) that carry electrical signals along the trunk cable (150). The electrical cables (168) may include one or more power conductors that transmit power along the trunk cable (150). The electrical cables (168) may include one or more data cables that transmit data signals along the trunk cable (150).

The optical cables (170) are a set of one or more cables in the trunk cable (150) that carry optical signal along the trunk cable (150). The optical cables (170) include the optical fibers (172) and the optical connectors (175).

The optical fibers (172) are a set of one or more fibers in the optical cables (170). Each optical fiber may carry a set of one or more optical signals.

The optical connectors (175) are the connectors between the optical cables (170) and the station equipment (190). The optical connectors (175) secure the optical cables (170) to the station equipment (190) for the transmission of the optical signals between the optical cables (170) and the station equipment (190).

The hoisting grip (152) is a grip that connects the trunk cable (150) to a support member. For example, the hoisting grip (152) may connect the trunk cable (150) to the tower (182) to lift, support, and secure the trunk cable (150) to the tower (182).

The spool (155) is a reel around which the trunk cable (150) may be wrapped. For example, prior to installation to the tower (182), the trunk cable (150) (before or after being attached to the unsealed module (102)) may be wrapped around the spool (155) and then shipped to the location of the tower (182).

The tower (182) is a structure that supports telecommunications equipment (e.g., antennas) for broadcasting wireless communication signals. The tower (182) includes the tower equipment (185) and the pole (188).

The tower equipment (185) generates wireless signals from the electrical and optical signals from the station equipment (190). The tower equipment (185) may include antennas, computers, routers, etc.

The pole (188) is a structural element of the tower (182). The pole (188) may be a cylindrical shaft. The pole (188) provides support for equipment attached to the tower (182), including the unsealed module (102).

The station equipment (190) transmits and receives optical and electrical signals to and from the tower equipment (185) of the tower (182). The optical and electrical signals are used for wireless communications with other devices with the range of the tower. The station equipment (190) may operate in accordance with one or more standards, including 4G, LTE, 5G standards.

Figure 2A:
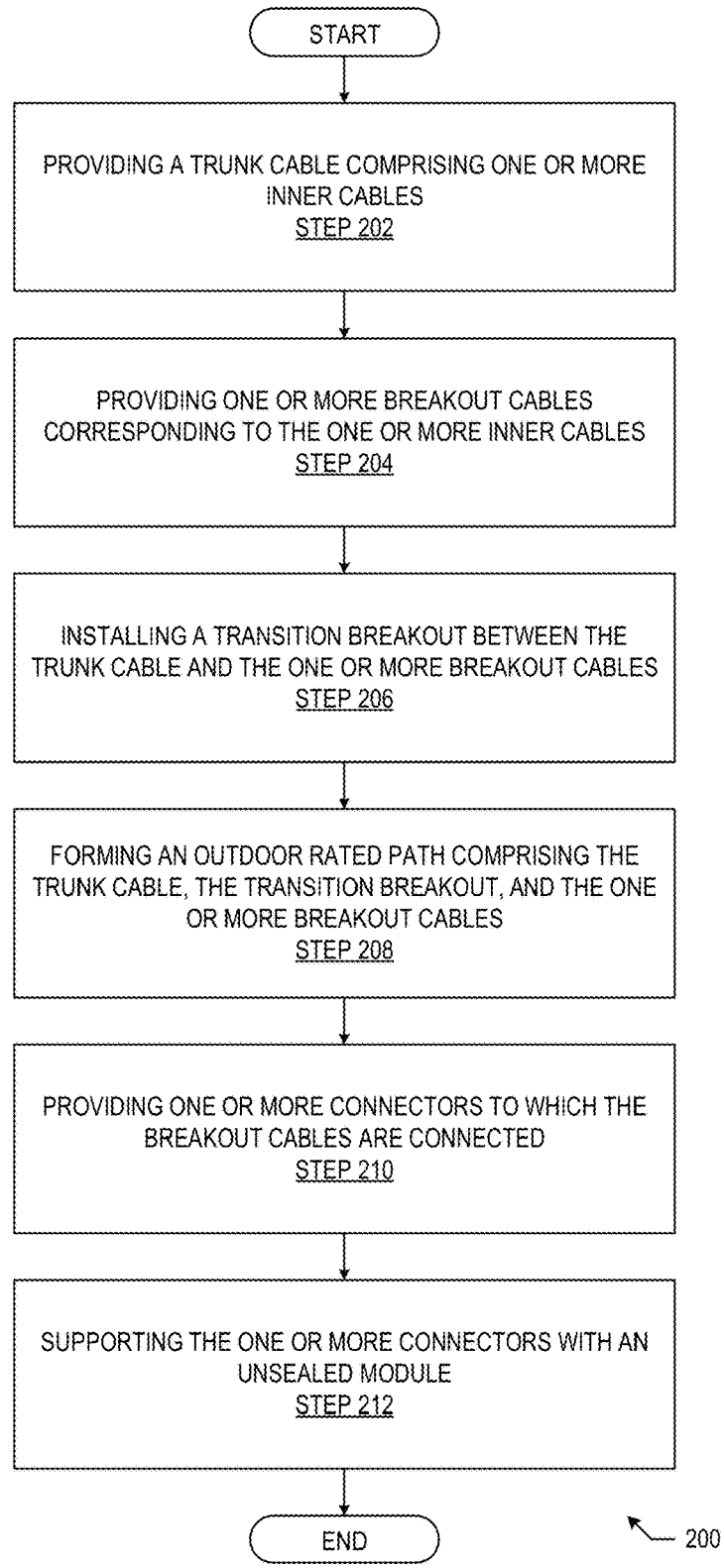
FIG. 2A and FIG. 2B show flowcharts in accordance with disclosed embodiments.
Figure 2B:
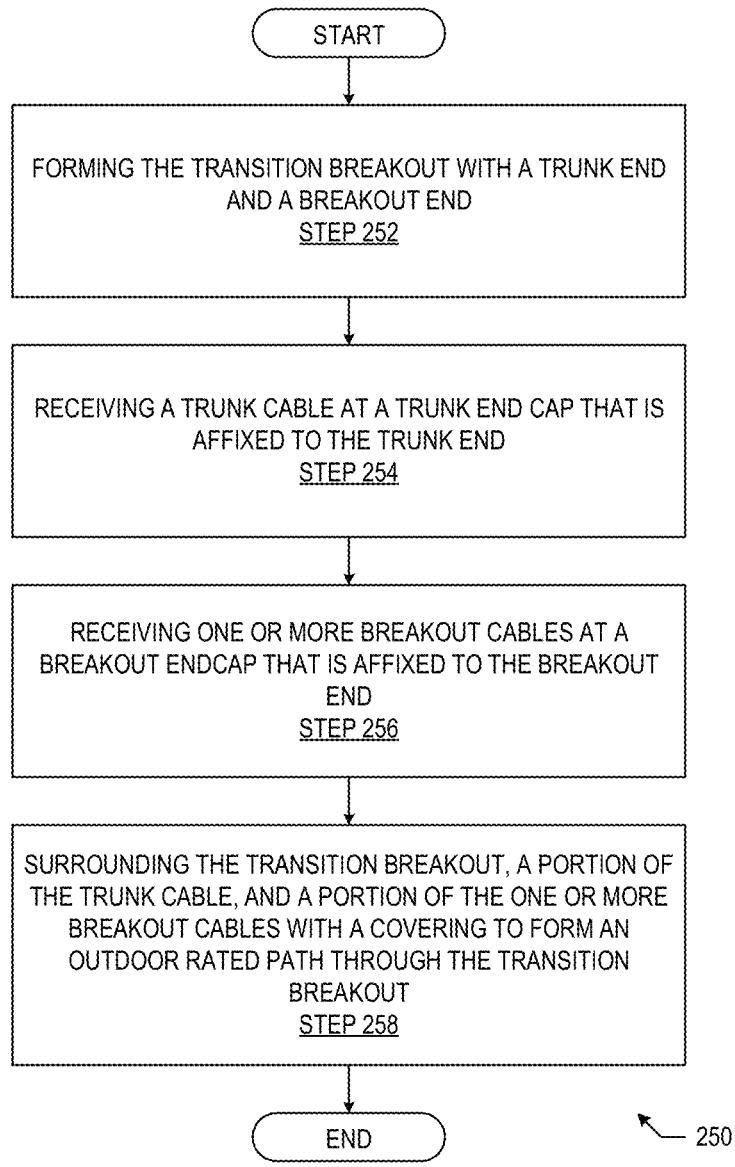

FIGS. 2A and 2B show flowcharts of a process in accordance with the disclosure. The embodiments of FIGS. 2A and 2B may be combined and may include or be included within the features and embodiments described in the other figures of the application. The features of FIGS. 2A and 2B are, individually and as an ordered combination, improvements to cable distribution technology and systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 2A, the process (200) implements a fiber distribution module. The module may be integrated with a trunk cable.

At Step 202, a trunk cable is provided that includes one or more inner cables. The trunk cable is constructed with a sheath surrounding the inner cables. The trunk cable may include a ripcord within the trunk cable. The inner cables may include electrical and optical cables configured to carry power and data signals.

In one embodiment, the trunk cable may be wrapped around a spool. A proximal end of the trunk cable may be unwound from the spool and processed to form the distribution module with the proximal end with the bulk of the trunk cable remaining wound around the spool.

At Step 204, one or more breakout cables are provided that correspond to the one or more inner cables. The breakout cables correspond to the inner cables in that the breakout cables are configured to carry the power and data signals from the inner cables. Each breakout cable includes an outer covering that protects cables within the breakout cables from environmental factors.

At Step 206, a transition breakout is installed between the trunk cable and the breakout cables. The installation is further described with respect to FIG. 2B.

At Step 208, an outdoor rated path is formed that includes the trunk cable, the transition breakout, and the breakout cables. The path from a distal end of the trunk cable, to a proximal end of the trunk cable, through the transition breakout, and through the breakout cables is outdoor rated. Each of the trunk cable, the transition breakout, and the breakout cables are rated for outdoor use may be installed and operated in outdoor environments.

At Step 210, connectors to which the breakout cables are connected are provided. A single connector may be connected to one or more breakout cables.

At Step 212, the connectors are supported with an unsealed module. The unsealed module provides a rigid structure, which supports the connectors.

Turning to FIG. 2B, the process (250) implements a transition breakout. The process (250) may be an extension of Step 206 of FIG. 2A.

At Step 252, the transition breakout is formed with a trunk end and a breakout end. The transition breakout includes a transition tube with holes on either end. The transition tube may be formed from a piece of rigid plastic. One end of the transition tube forms the trunk end, and the other end forms the breakout end.

At Step 254, a trunk cable is received at a trunk end cap that is affixed to the trunk end. The trunk end cap may be formed from rigid plastic. The inner cables, from the trunk cable, are exposed in the transition breakout. In one embodiment, the inner cables and the sheath are fitted through the trunk end cap. A section of the sheath is removed to expose the inner cables. In one embodiment, the inner cables from the trunk cable may form the breakout cables. In one embodiment, one or more of the inner cables may be spliced with the breakout cables.

At Step 256, breakout cables are received at a breakout endcap that is affixed to the breakout end. The breakout endcap may be formed from rigid plastic. The breakout endcap is configured to fit to the breakout end of the transition tube and includes holes for each of the breakout cables. A protective covering may be added to the inner cables from the trunk cable to form the breakout cables. In one embodiment, one or more of the inner cables already include a protective covering.

At Step 258, the transition breakout, a portion of the trunk cable, and a portion of the one or more breakout cables are surrounded with a covering to form an outdoor rated path through the transition breakout. In one embodiment, the covering may be a heat shrinkable plastic covering. The covering protects the inner cables, which may be exposed in the transition tube of the transition breakout, from environmental factors.

FIGS. 3A through 10 show examples in accordance with the disclosure. Embodiments of FIGS. 3A through 10 may be combined and may include or be included within the features and embodiments described in the other figures of the application. The features and elements of FIGS. 3A through 10 are, individually and as a combination, improvements to cable distribution technology and systems. The various features, elements, widgets, components, and interfaces shown in FIGS. 3A through 10 may be omitted, repeated, combined, and/or altered as shown. Accordingly, the scope of the present disclosure should not be considered limited to the specific arrangements shown in FIGS. 3A through 10.

Figure 3B:
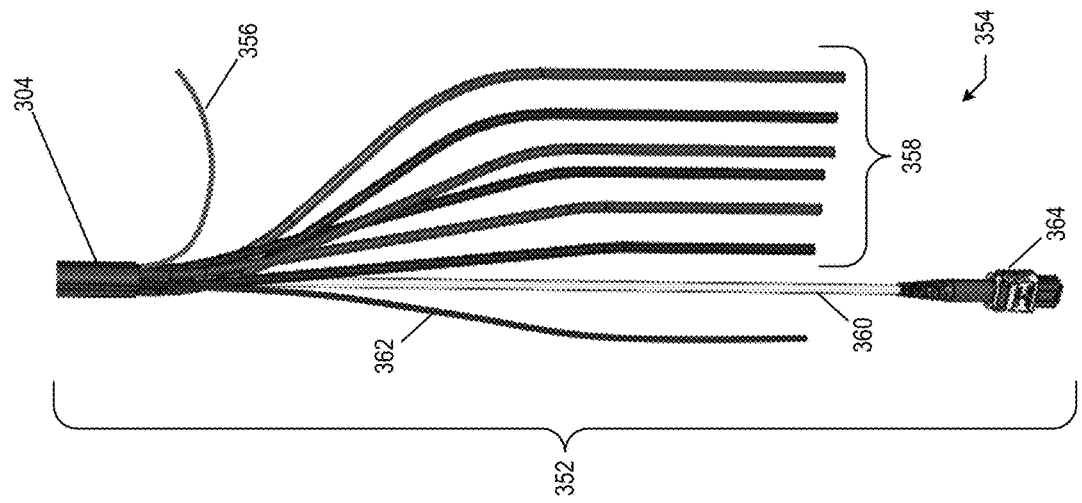
Figure 3A:
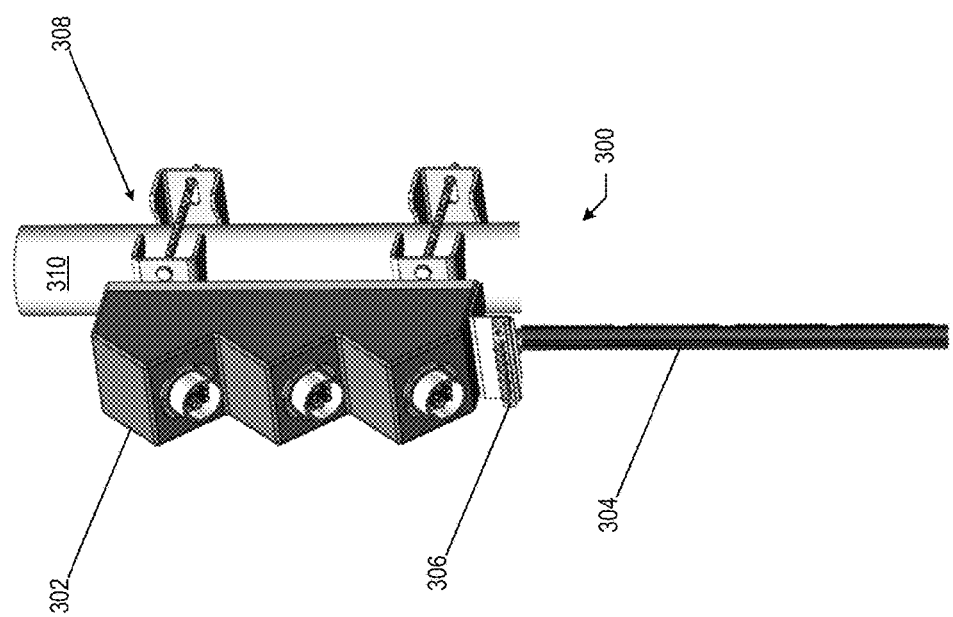

Turning to FIG. 3A, the cable distribution system (300) includes the unsealed module (302) connected to the trunk cable (304). The cable distribution system (300) includes the ground bar (306).

The cable distribution system (300) includes the pole clamp (308). The pole clamp (308) attaches the unsealed module (302) to the pole (310).

Turning to FIG. 3B, the distal end (352) of the trunk cable (304) is exposed to show the inner cables (354). The distal end (352) of the trunk cable (304) may be the end of the trunk cable (304) that is connected to station equipment. The inner cables (354) include the rip cord (356), the electrical cables (358), the optical cable (360), and the ground wire (362).

The rip cord (356) is a fiber in the trunk cable (304). When pulled, the rip cord (356) rips open the outer covering of the trunk cable (304).

The electrical cables (358) are electrical wires that carry electrical signals along the trunk cable (304). The electrical signals may include power signals, data signals, and combinations thereof.

In one embodiment, the electrical cables (358) include three pairs of power conductors. One wire of a pair may connect to the positive voltage terminal of a power supply, and the other wire of a pair may connect to a negative voltage terminal of a power supply. The different wires may have different colors selected to identify the type of electrical signal used with the wire. In one embodiment.

In one embodiment, one or more of the electrical cables (358) may carry electrical data signals. In one embodiment, one pair of wires of the electrical cables (358) may carry data signals, and the two additional pairs may carry power signals. More or fewer electrical cables may be provided. Some of the electrical cables may have connecters (not shown) at an end of the cable.

The optical cable (360) includes one or more optical fibers that carry optical signals along the trunk cable (304). The optical signals include data signals for communication between the equipment through which the trunk cable (304) is connected. The optical cable (360) includes the connector (364). The connector (364) interfaces with an optical port on the station equipment to which the trunk cable (304) is connected.

The ground wire (362) is an electrical cable within the trunk cable (304). The ground wire (362) may be connected to the ground bar (306) (of FIG. 3A). The ground wire (362) prevents the build up of excess electrical charge.

Figure 4A:
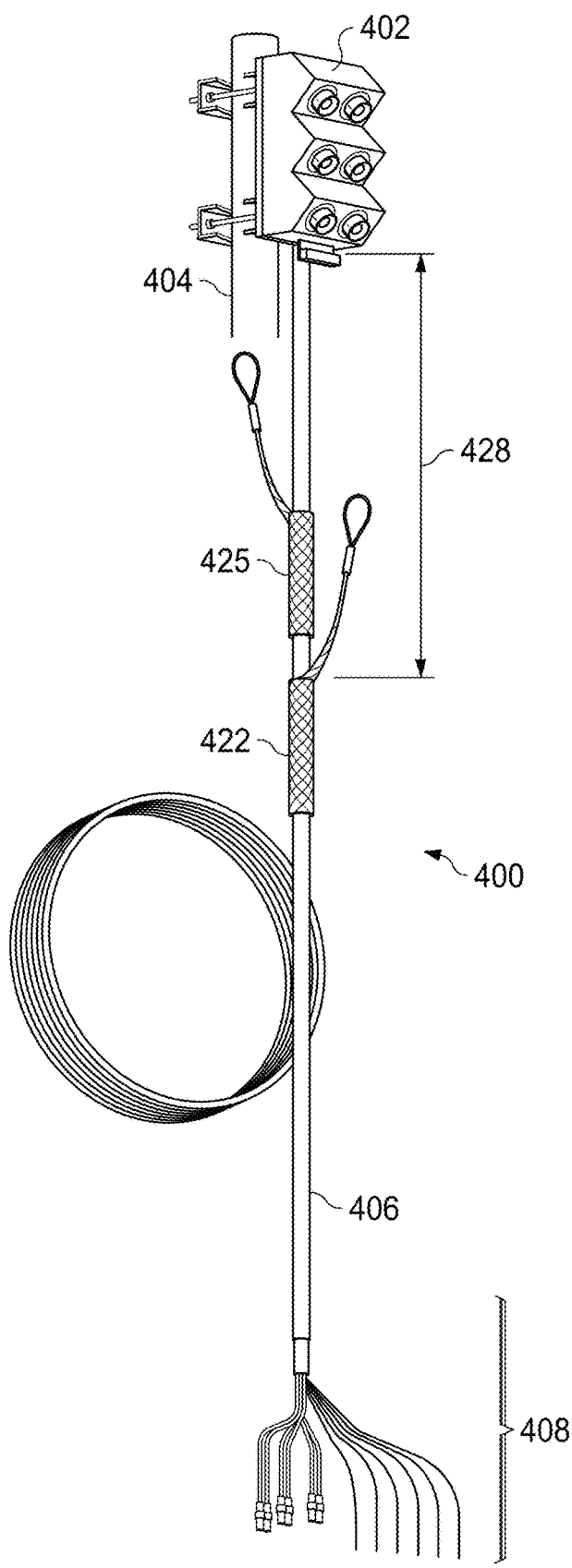

Turing to FIG. 4A, the cable distribution system (400) includes the unsealed module (402). The unsealed module (402) is installed onto the pole (404) and attached to the trunk cable (406).

The trunk cable (406) includes the distal end (408). The distal end (408) includes three pairs of optical cables fitted to two connectors and includes three pairs of power conductors.

The trunk cable (406) is fitted within the hoisting grip A (422) and hoisting grip B (425). The hoisting grips A (422) and B (425) support the trunk cable (406) after installation to a tower. In one embodiment, the length (428) from the unsealed module (402) to the hoisting grip A (422) is about six feet.

Figure 4B:
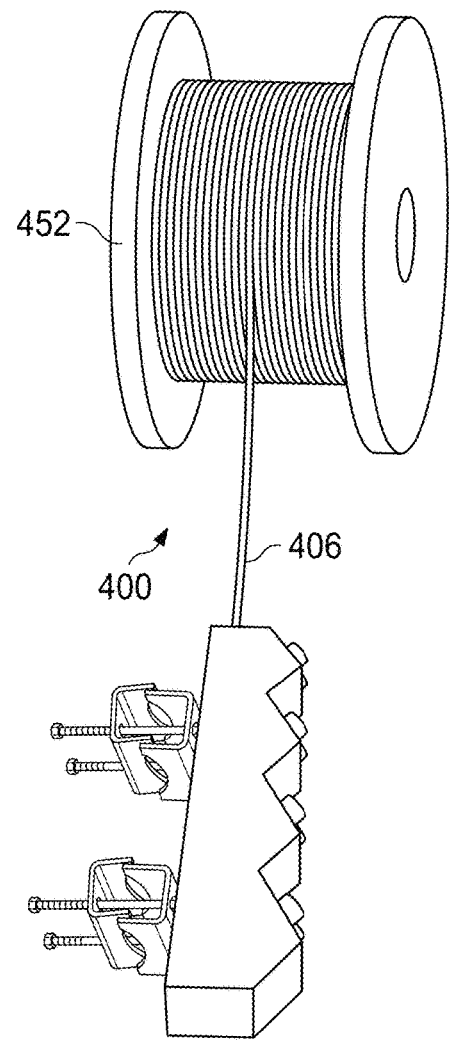

Turning to FIG. 4B, the cable distribution system (400) is not installed to a pole of a tower. The trunk cable (406) is wound around the spool (452).

Figure 5B:
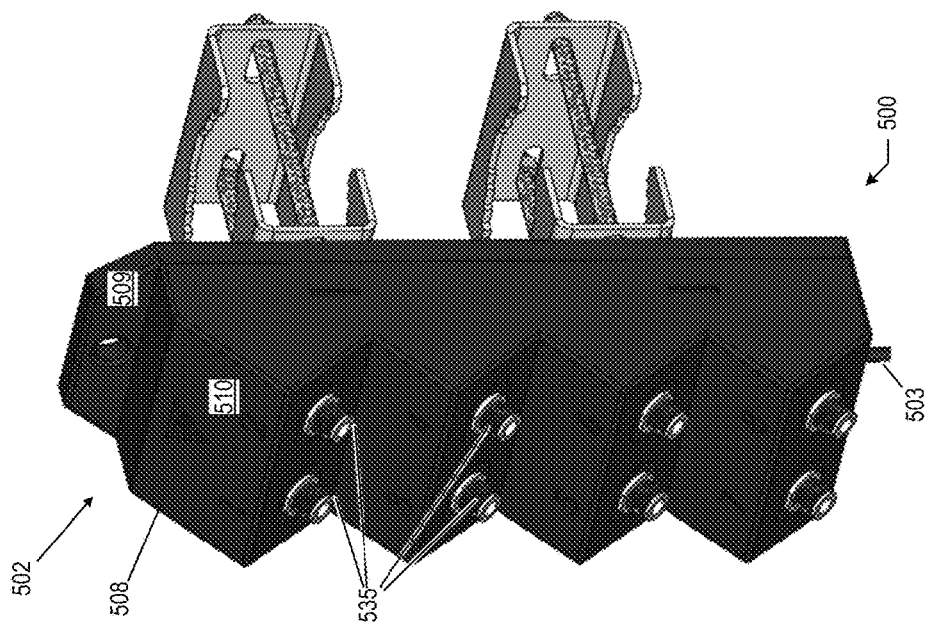
Figure 5A:
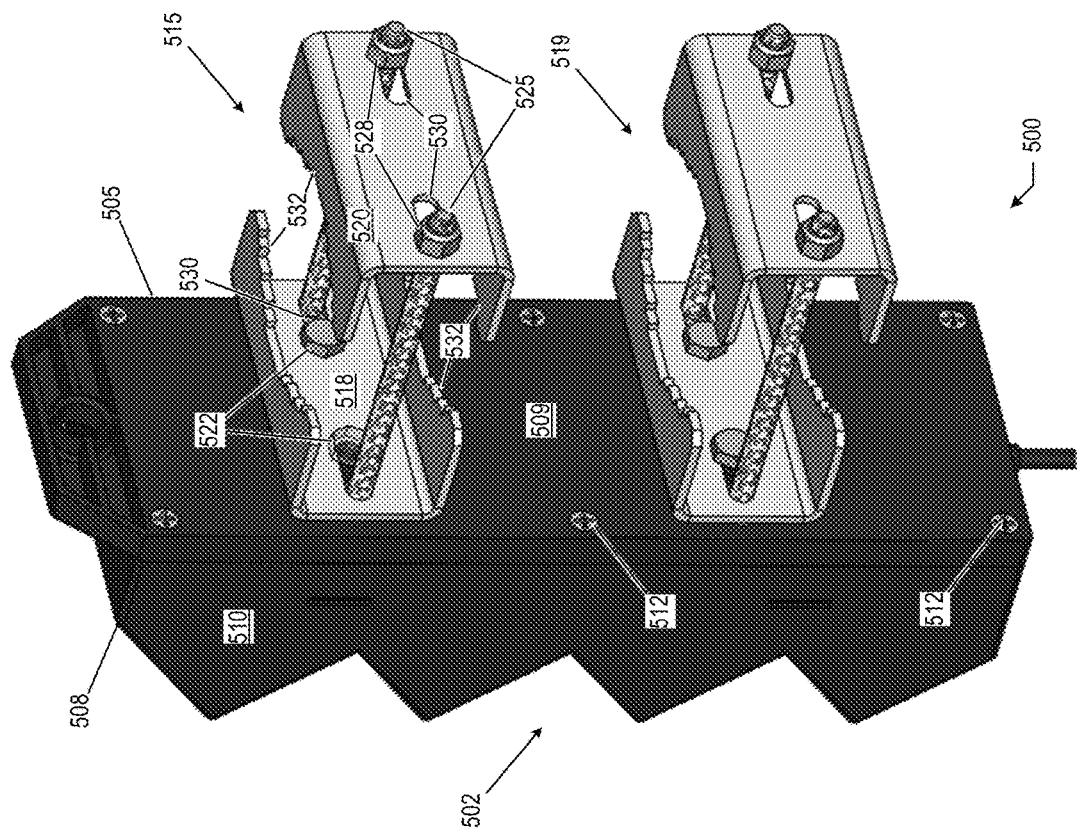

Turning to FIG. 5A, the cable distribution system (500) includes the unsealed module (502). The unsealed module includes a proximal end (505) and a distal end (508).

The proximal end (505) includes the base (509) of the unsealed module (502) to which the cover (510) is attached with the screws (512). The proximal end (505) includes the pole clamps A (515) and B (519).

The pole clamp A (515) includes a proximal end (518) and a distal end (520). The pole clamp B (519) includes similar structures and elements as the pole clamp A (515). The proximal end (518) and the distal end (520) are fitted around a pole and squeezed together secure the unsealed module (502) into place. The bolts (522) secure the pole clamp A (515) to the unsealed module (502). The distal end (520) is secured with the combination of the bolts (525) and nuts (528).

The proximal end (518) and the distal end (520) may be similarly shaped structures. The proximal end (518) and the distal end (520) include the holes (530) used to secure the pole clamp A (515) to the unsealed module (502) with bolts (522) and to a pole with the bolts (525) and nuts (528).

The proximal end (518) and the distal end (520) include the digitally shaped contours (532). The digitally shaped contours (532) are sized to fit multiple diameters of poles within the pole clamp A (515).

Turning to FIG. 5B, the cable distribution system (500) includes the connectors (535) on the cover (510) of the distal end (508). The eight connectors (535) are arranged into four rows and two columns. The connectors (535) are pointed at an angle away from the normal of the base (509) that corresponds to an axis perpendicular to the base (509) and will be perpendicular to an axis of a pole to which the unsealed module (502) is attached. In one embodiment, the connectors are pointed away at about a 45-degree angle from the normal of the base (509).

The trunk cable (503) fits into the unsealed module (502). Inside the unsealed module (502), the inner cables from the trunk cable (503) are split out into breakout cables that are fitted to the connectors (535).

Figure 5D:
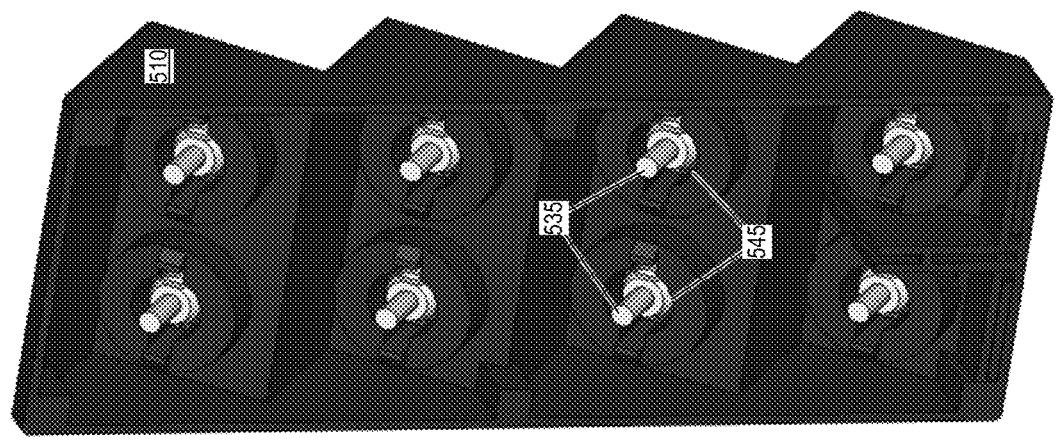
Figure 5C:
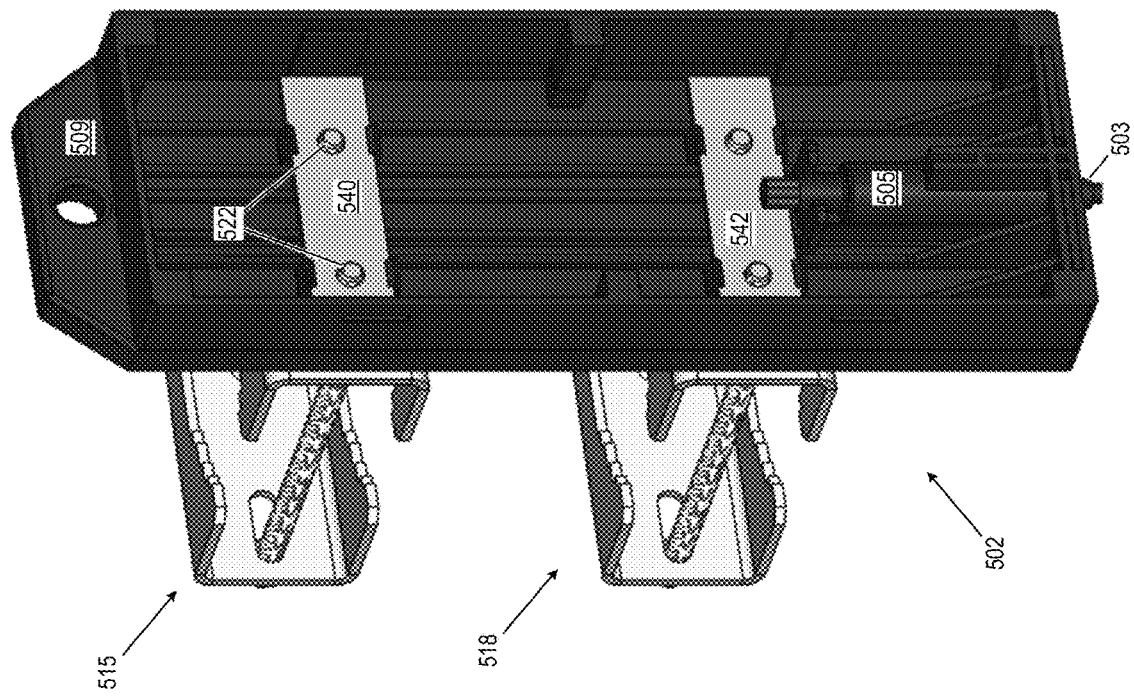

Turning to FIG. 5C, an interior of the base (509) is shown. The pole clamps A (515) and B (518) include the plates (540) and (542). The bolts (522) are fitted into the plate (540) to secure the pole clamp A (515) to the base (509).

The trunk cable (503) is fitted to the transition breakout (505). The transition breakout (505) is fitted within the base (509) of the unsealed module (502)

Turning to FIG. 5D, a cut away of the cover (510) is shown. The cover (510) includes the openings (545) for the connectors (535). Different embodiments may use different types of connectors.

Turning to FIG. 5E, the connector (535) is shown prior to installation into the opening (545). The connector (535) is surrounded by the fitting (548), which is formed of two pieces. The fitting (548) snaps into the opening (545) to secure the connector (535) to the unsealed module (502).

Figure 5G:
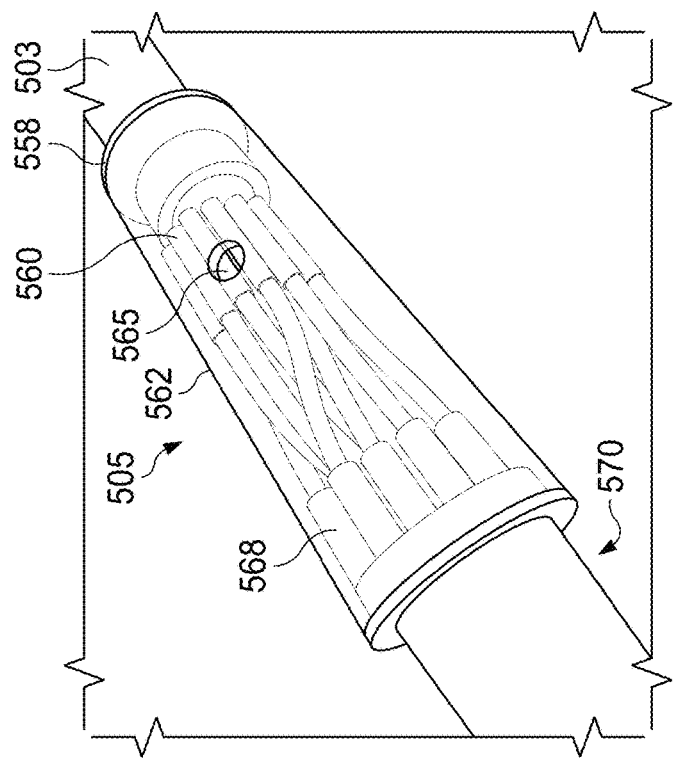
Figure 5F:
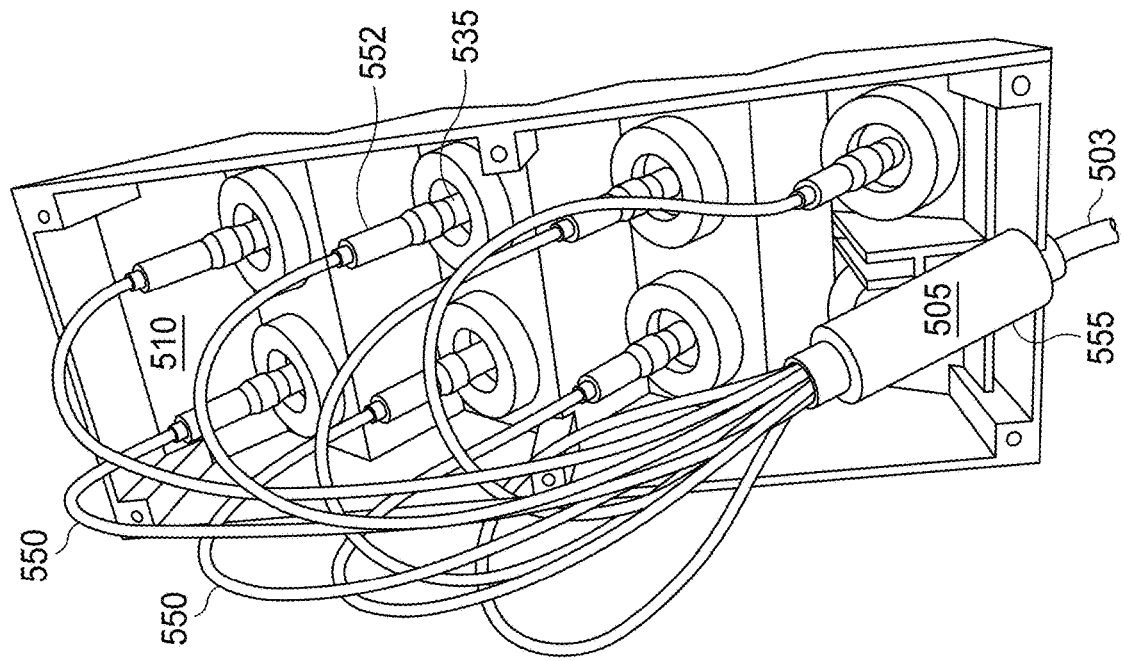

Turning to FIG. 5F, the inside of the cover (510) is shown with the breakout cables (550). The breakout cables (550) extend from the transition breakout (505) to the connectors (535). The breakout cables (550) include an additional cover (552) that protects the inner cable and provides strain relief. The transition breakout (505) is wrapped in the transition cover (555). The transition cover (555) covers a transition tube, a portion of the breakout cables, and a portion of the trunk cable (503).

Turning to FIG. 5G, the transition breakout (505) is shown without the transition cover (555) (of FIG. 5F). The trunk cable (503) enters through the trunk end cap (558). The inner cables (560) from the trunk cable (503) are exposed within the transition tube (562) and re-sheathed to form the breakout cables (568). The transition tube (562) includes the hole (565). The hole (565) may be used to fill the transition tube (562) with epoxy. The breakout cables (568) are wrapped with an additional cover (570).

Figure 6:
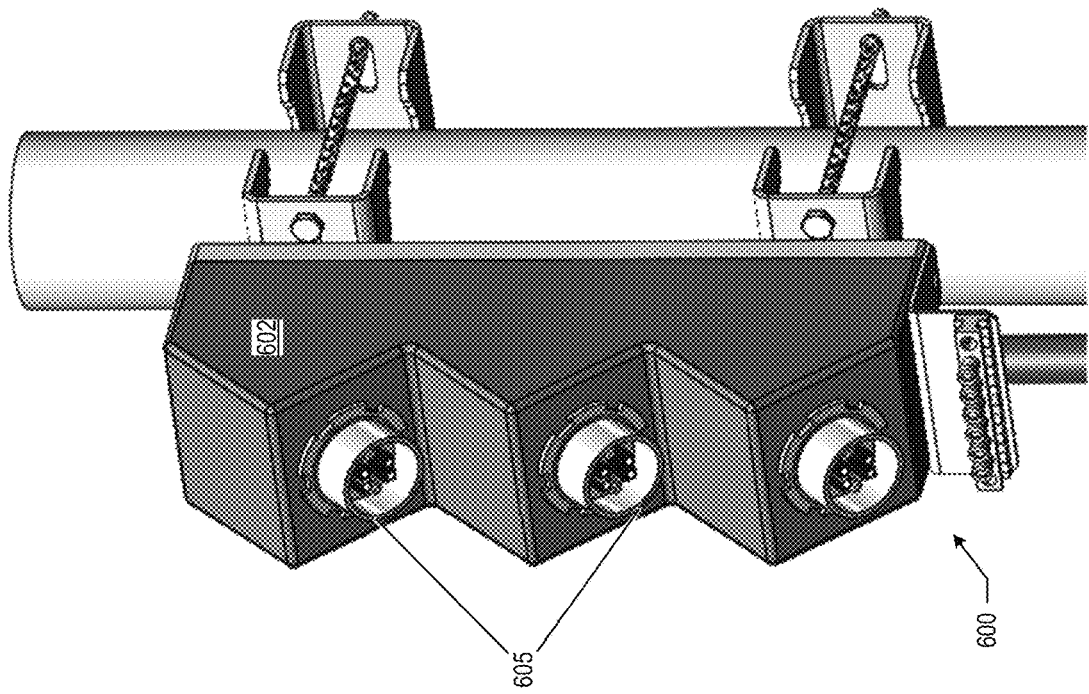

Turning to FIG. 6, the cable distribution system (600) includes the unsealed module (602). The unsealed module (602) includes three rows and one column of connectors (605). Each of the connectors (605) is a hybrid connector that distributes electrical power signals and optical data signals.

Figure 7:
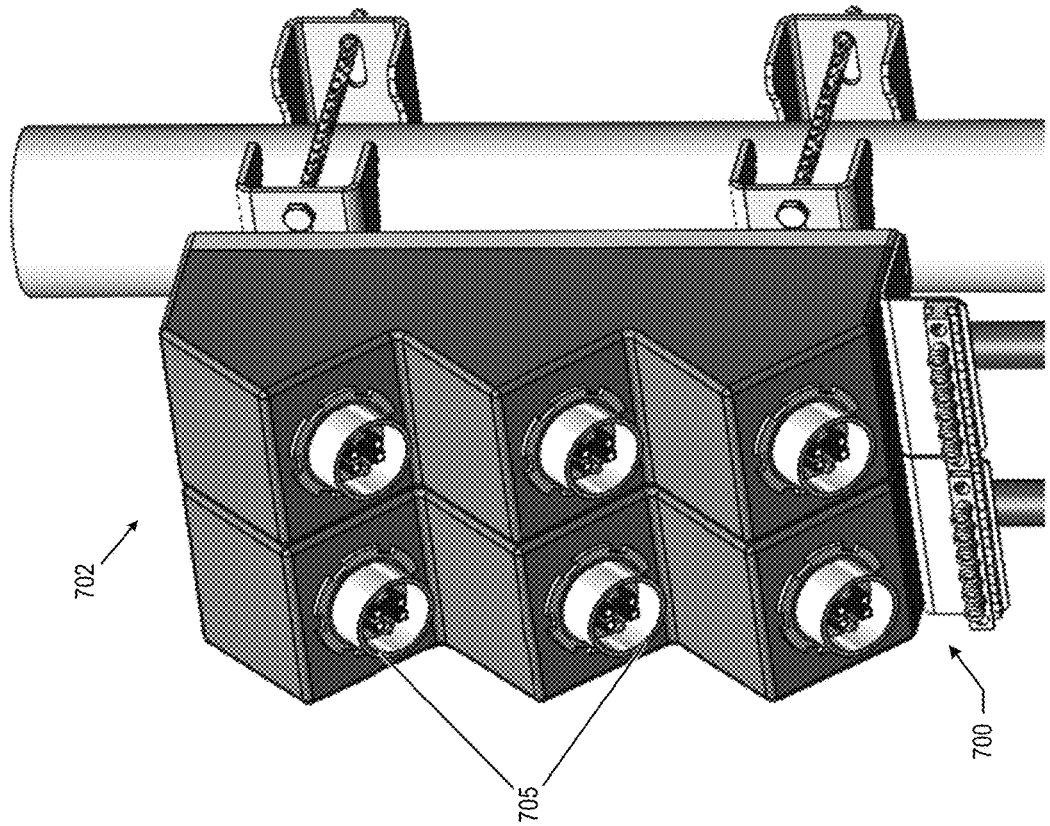

Turning to FIG. 7, the cable distribution system (700) includes the unsealed module (702). The unsealed module (702) includes three rows and two columns of connectors (705). In one embodiment, the cable distribution system (700) is a "build as you go" system that includes two single column cable distribution systems (see FIG. 6) that are juxtaposed together.

Figure 8:
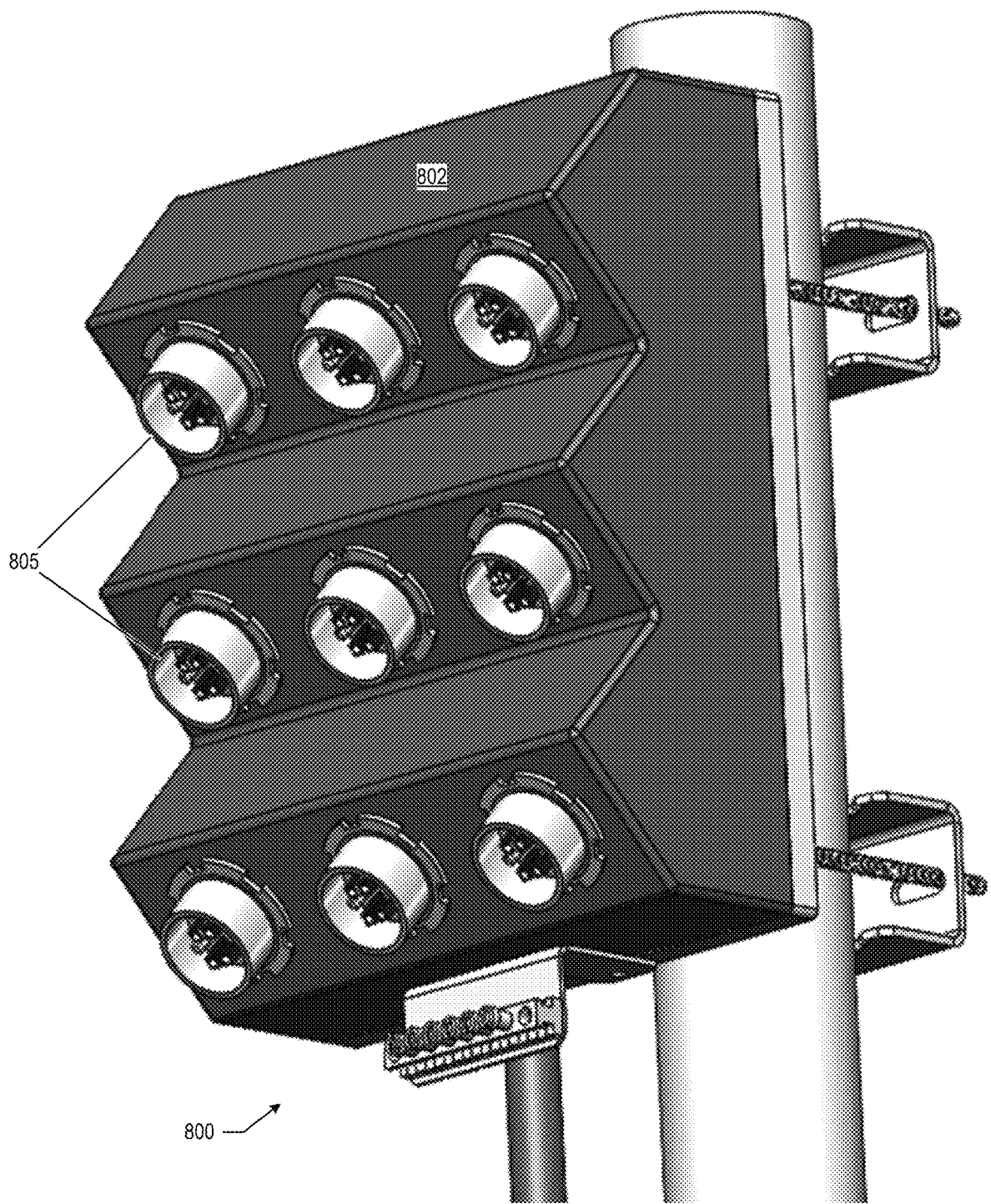

Turning to FIG. 8, the cable distribution system (800) includes the unsealed module (802). The unsealed module (802) includes three rows and three columns of connectors (805). In one embodiment, the cable distribution system (800) is formed with a single three column cable distribution system.

Figure 9:
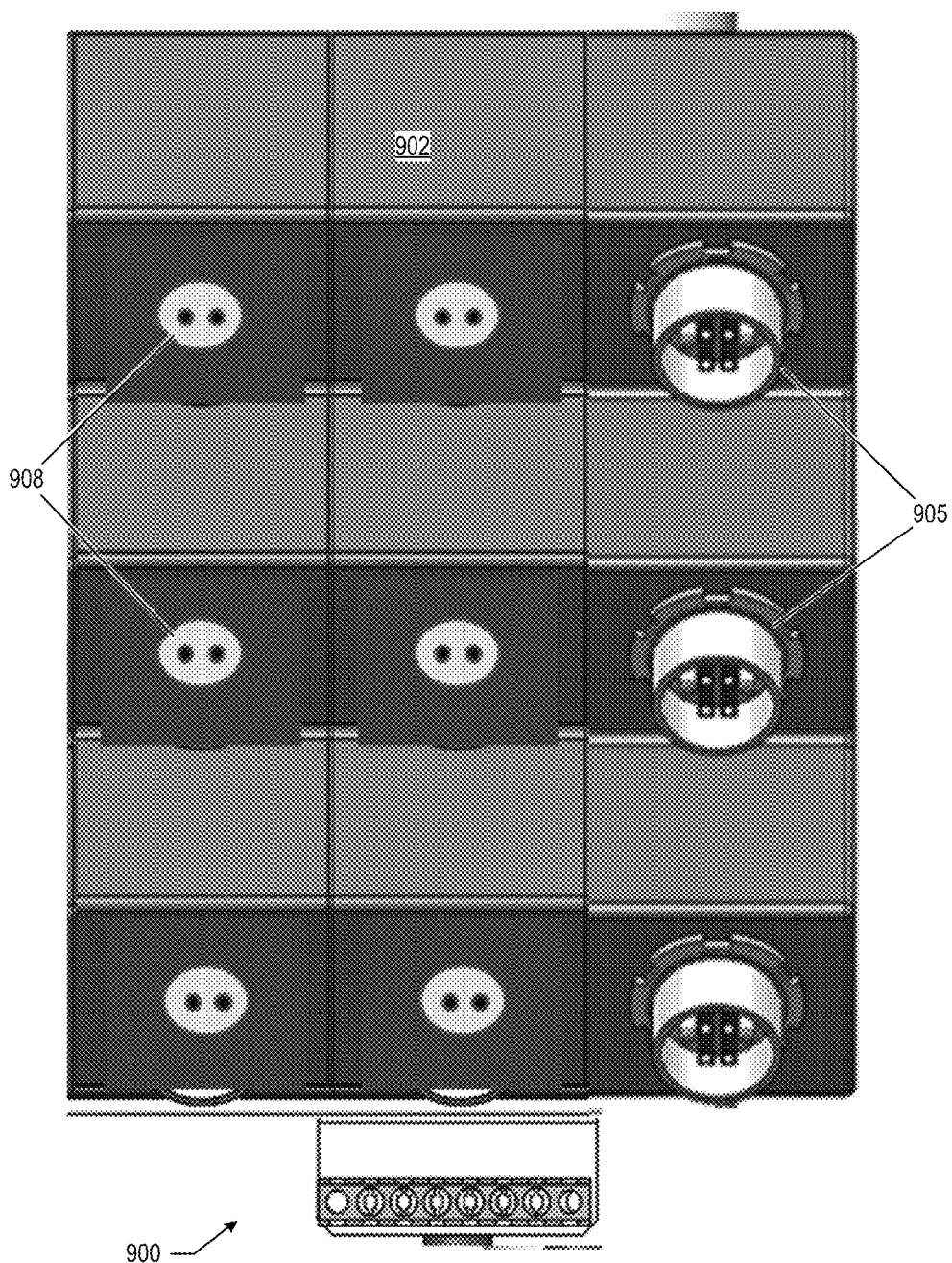

Turning to FIG. 9, the cable distribution system (900) includes the unsealed module (902). The unsealed module (902) includes three rows and three columns of the connectors (905) and (908). The connectors (905) are hybrid connectors that carry electrical signals and optical signals. The connectors (908) are electrical connectors that carry electrical (e.g., power) signals. In one embodiment, the cable distribution system (900) may be formed by integrating one single column cable distribution system (see FIG. 6) and one two column cable distribution system (see FIG. 7) into a three column cable distribution system.

Figure 10:
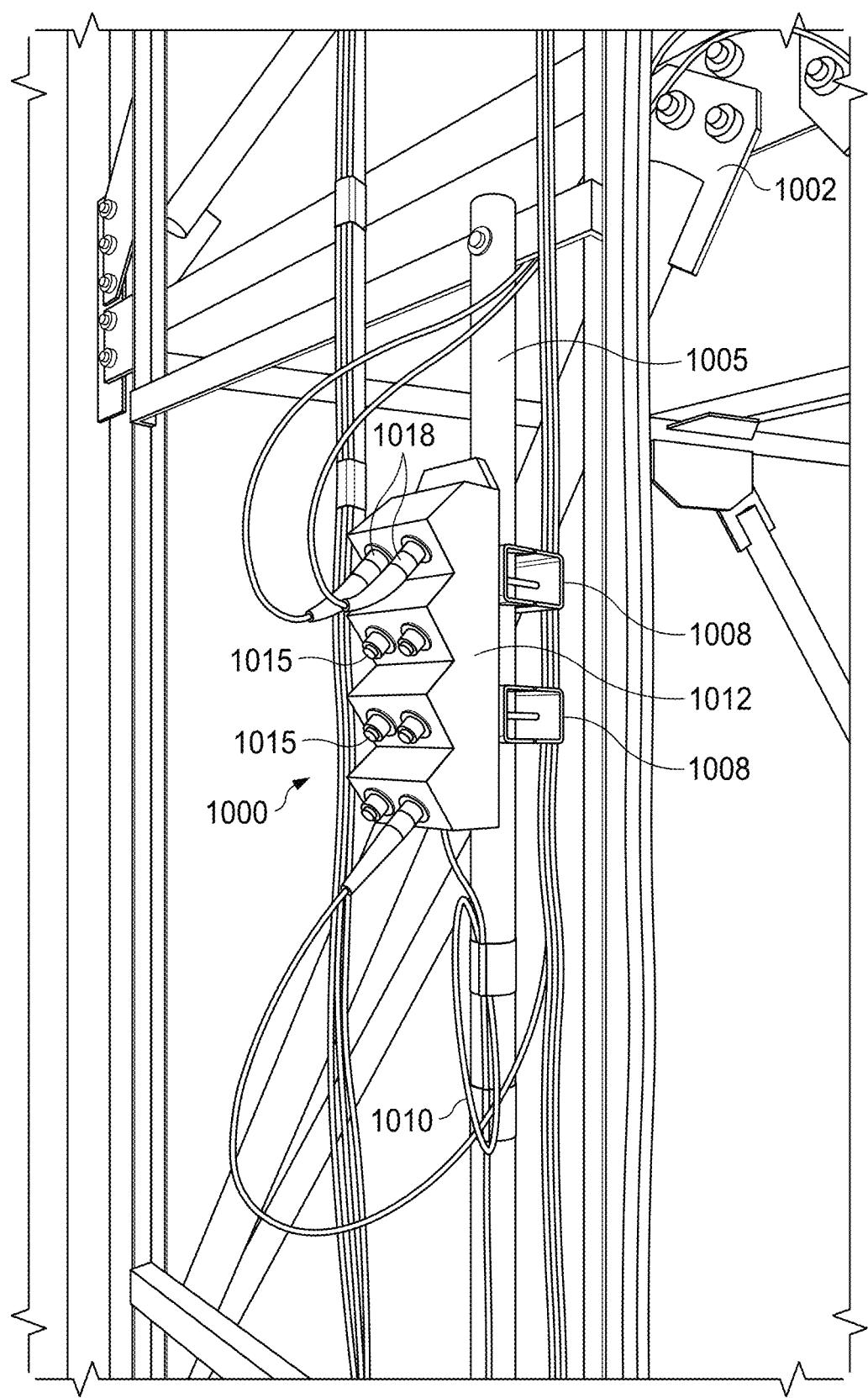

Turning to FIG. 10, the cable distribution system (1000) is installed to the tower (1002). The tower (1002) includes the pole (1005), to which the cable distribution system (1000) is attached using the pole clamps (1008). The trunk cable (1010) enters the unsealed module (1012). The inner cables of the trunk cable (1010) are distributed to the connectors (1015). The tower cables are connected between connectors (1015) of the cable distribution system (1000) and tower equipment (e.g., communications computing systems and antennas).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:
    a trunk cable comprising one or more inner cables;
    one or more breakout cables corresponding to the one or more inner cables;
    a transition breakout between the trunk cable and the one or more breakout cables;
    an outdoor rated path comprising a covering that surrounds a portion of the trunk cable, the transition breakout, and a portion of the one or more breakout cables;
    one or more connectors to which the one or more breakout cables are connected;
    and an unsealed module supporting the one or more connectors.

2. The apparatus of claim 1, further comprising:
    the transition breakout comprising a trunk end and a breakout end;
    a trunk end cap that receives a trunk cable and is affixed to the trunk end;
    a breakout endcap that receives one or more breakout cables and is affixed to the breakout end.

3. The apparatus of claim 1, further comprising: a spool around which at least a portion of the trunk cable is wrapped.

4. The apparatus of claim 1, further comprising: a distal end of the unsealed module comprising the one or more connectors.

5. The apparatus of claim 1, further comprising:
    a proximal end of the unsealed module comprising a pole clamp.

6. The apparatus of claim 1, further comprising: a pole clamp of the unsealed module configured to clamp to a pole of a tower.

7. The apparatus of claim 1, further comprising: the one or more breakout cables enclosed within the unsealed module.

8. The apparatus of claim 1, further comprising: the transition breakout enclosed within the unsealed module.

9. The apparatus of claim 1, further comprising: the trunk cable comprising a plurality of electrical cables.

10. The apparatus of claim 1, further comprising: the trunk cable comprising an optical cable.

11. The apparatus of claim 1, further comprising: an optical cable, of the trunk cable, comprising one or more optical fibers.

12. The apparatus of claim 1, further comprising: an optical cable, of the trunk cable, connected to an optical connector.

13. The apparatus of claim 1, further comprising:
    hoisting grip connected to the trunk cable configured to support the trunk cable and connect the trunk cable to a tower.

14. A method, comprising:
    providing a trunk cable comprising one or more inner cables;
    providing one or more breakout cables corresponding to the one or more inner cables;
    installing a transition breakout between the trunk cable and the one or more breakout cables;
    forming an outdoor rated path by surrounding a portion of the trunk cable, the transition breakout, and a portion of the one or more breakout cables with a covering;
    providing one or more connectors to which the one or more breakout cables are connected;
    and supporting the one or more connectors with an unsealed module.

15. The method of claim 14, further comprising:
    forming the transition breakout with a trunk end and a breakout end;
    receiving a trunk cable at a trunk end cap that is affixed to the trunk end;
    receiving one or more breakout cables at a breakout endcap that is affixed to the breakout end.

16. The method of claim 14, further comprising:
    wrapping at least a portion of the trunk cable around a spool.

17. An apparatus comprising:

transition breakout comprising a trunk end and a breakout end;

a trunk end cap that receives a trunk cable and is affixed to the trunk end;

a breakout endcap that receives one or more breakout cables and is affixed to the breakout end;

and a covering surrounding the transition breakout, a portion of the trunk cable, and a portion of the one or more breakout cables to form an outdoor rated path through the transition breakout.

18. The apparatus of claim 17, further comprising:

the transition breakout enclosed within the unsealed module.

19. The apparatus of claim 17, further comprising: the one or more breakout cables enclosed within the unsealed module.

20. The apparatus of claim 17, further comprising:

the trunk cable comprising a plurality of power conductors and an optical cable.

* * * * *